(12) United States Patent
Yao et al.

(10) Patent No.: US 7,553,038 B2
(45) Date of Patent: Jun. 30, 2009

(54) SIGN STRUCTURE FOR A PERSONAL COMPUTER

(75) Inventors: Sung-Yi Yao, Taipei (TW); Yen-Po Yu, Taipei (TW)

(73) Assignee: Asustek Computer Inc., Taipei (TW)

( * ) Notice: Subject to any disclaimer, the term of this patent is extended or adjusted under 35 U.S.C. 154(b) by 97 days.

(21) Appl. No.: 11/802,286

(22) Filed: May 22, 2007

(65) Prior Publication Data

US 2007/0279893 A1 Dec. 6, 2007

(30) Foreign Application Priority Data

May 30, 2006 (TW) .............................. 95119152 A

(51) Int. Cl.
*F21V 33/00* (2006.01)
*H05K 5/02* (2006.01)
*F21L 4/04* (2006.01)

(52) U.S. Cl. .......................... 362/85; 362/602; 362/362; 361/686

(58) Field of Classification Search .................. 362/34, 362/84, 85, 95, 86, 362, 602; 361/683, 686; 349/61–63; 345/211
See application file for complete search history.

(56) References Cited

U.S. PATENT DOCUMENTS

| 5,537,300 | A | * | 7/1996 | Kraines et al. ................. 362/86 |
| 5,816,682 | A | * | 10/1998 | Marischen .................... 362/84 |
| 6,270,229 | B1 | * | 8/2001 | Chien ........................... 362/84 |
| 6,814,472 | B2 | * | 11/2004 | D'Andrea et al. ............ 362/371 |
| 7,036,948 | B1 | * | 5/2006 | Wyatt ........................... 362/95 |
| 7,044,614 | B2 | * | 5/2006 | Levy et al. .................... 362/84 |
| 2006/0061983 | A1 | * | 3/2006 | Chen et al. .................... 362/84 |
| 2007/0081320 | A1 | * | 4/2007 | Gilbert ......................... 362/34 |

* cited by examiner

*Primary Examiner*—Jacob Y Choi
(74) *Attorney, Agent, or Firm*—Bacon & Thomas, PLLC

(57) ABSTRACT

A sign structure for a personal computer includes a casing panel, an illuminating panel, and a sign panel. The casing panel has a least one slot opening. The illuminating panel, mounted adjacent to an exterior surface of the casing panel has at least one through opening corresponding to the slot opening, and at least one power supply connector. The sign panel mounted adjacent to an exterior side of the illuminating panel has at least one through hole corresponding to the through opening. Besides, at least part of the sign panel is transparent. Therefore, the illuminating panel of the sign structure for a personal computer of the invention can illuminate when the power is transmitted through the power supply connector to it, in order to differentiate the I/O connectors of the personal computer in low light conditions.

10 Claims, 5 Drawing Sheets

SIGN STRUCTURE FOR A PERSONAL COMPUTER

BACKGROUND OF THE INVENTION

1. Field of the Invention

The present invention relates to a sign structure for a personal computer and, more particularly, to a sign structure formed on the back panel of a desktop personal computer.

2. Description of Related Art

Current desktop personal computers on the market at least include the following main components: a motherboard, a CPU (Central Processing Unit), a memory unit, a hard drive, an optical disc drive, and a power supply. The computer peripherals and other externally connected devices are connected with the personal computer via a plurality of Input/Output ports (I/O ports). The I/O ports configured on the back panel of the casing panel of the personal computer generally include serial ports, parallel ports, PS/2 ports, USB (Universal Serial Bus) ports, and slots for all kinds expansion cards, such as graphics cards, sound cards, network cards, etc.

Owing to the numerous I/O ports configured on the back panels of the traditional personal computers, an engraved symbol or a name label is generally shown nearby to each I/O port to indicate the functions thereof. However, as the fully configured personal computers are generally placed in the corner of a desk or near a wall, a user may experience difficulty in differentiating the names, labels or the symbols of the I/O ports on the back panel of the personal computer in a low light environment. Hence, when there is a need to plug/unplug or replace the I/O connectors of the peripheral devices, a user often needs to move the casing panel of the personal computer to a brighter location in order to identify the I/O ports and accomplish the task. In other words, plugging/unplugging or replacing the I/O connectors of the peripheral devices in a traditional personal computer back panel without any lighting structure can be difficult and time-consuming.

SUMMARY OF THE INVENTION

The object of the present invention is to provide a sign structure for a personal computer, which includes a casing panel, an illuminating panel, and a sign panel. The casing panel includes at least one slot opening. The illuminating panel is mounted adjacent to an exterior surface of the casing panel, and includes at least one through opening and at least one power supply connector. The through opening corresponds to the slot opening of the casing panel. The sign panel is mounted adjacent to an exterior side of the illuminating panel, and includes at least one through hole corresponding to the through opening of the illuminating panel. Preferably, at least part of the sign panel is transparent.

Therefore, the illuminating panel of the invention can be illuminating through the power provided by the power supply connector, enabling a user to differentiate among different I/O connectors of the personal computer in a low light condition, and thus to successfully plug/unplug or replace the connectors of a peripheral device.

The illuminating panel of the sign structure for a personal computer of the present invention can be an electroluminescent panel (EL panel), an illuminating panel structure comprising a light guide plate and an Light Emitting Diode (LED), or other equivalent illuminating panel structures, such as an illuminating panel structure comprising a light guide plate and an organic electroluminescent device (OLED).

Also, the illuminating panel of the sign structure for a personal computer of the present invention can be directly adhered to the an exterior surface of the casing of the personal computer, with an adhesive material or other equivalent affixing means, such as screws, or lock engagements.

Moreover, the sign of the sign structure for a personal computer of the present invention can be directly adhered to an exterior side of the illuminating panel with an adhesive material or other equivalent affixing means, such as screws, or lock engagements.

The sign panel of the sign structure for a personal computer of the present invention can further include at least one sign label, affixing on the surface of the sign panel for indicating the different functions of the I/O ports on the casing panel of the personal computer.

The surface of the sign label can further be coated with a luminous ink layer or other equivalent light emitting material, such that the sign labels can appear brighter.

The surface of the sign panel can further be coated with a luminous ink layer or other equivalent light emitting material, such that the sign panel can appear brighter.

In addition, the casing panel of the personal computer having the sign structure of the present invention can further include an aperture, which the power supply connector passes through in order to connect with the power supply unit or the motherboard of the personal computer. The power supply connector can also be connected with an external power supply, such that the illuminating panel can still illuminate even when the power supply of the personal computer is shutdown or experiencing failure.

Also, the sign labels of the sign panel can be in at least one of the following forms: words, numbers, patterns, drawings, and symbols, for the user to easily identify the functions of the I/O ports.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
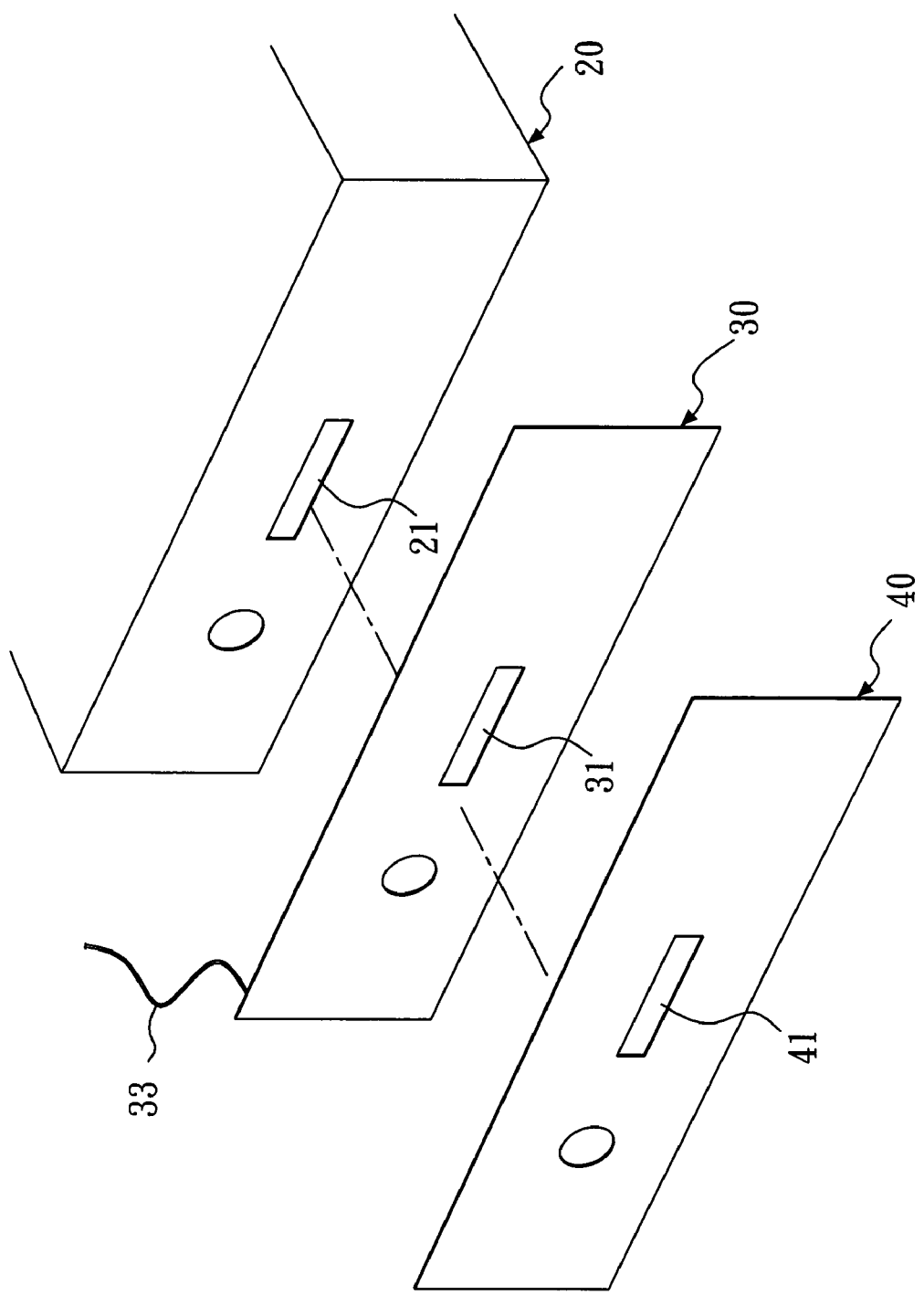
FIG. 1 is an exploded diagram illustrating of the main architecture of a sign structure for a personal computer of the invention.

FIG. 1 shows an exploded diagram of the main architecture of a sign structure for a personal computer of the invention. As shown in the figure, the invention relates to a sign structure for a personal computer with its main architecture including a casing panel 20, an illuminating panel 30, and a sign panel 40. The casing panel 20 includes a plurality of slot openings 21. The illuminating panel 30 is mounted adjacent to the exterior surface of the casing panel 20, and includes a plurality of through openings 31 and a power supply connector 33. The shape and the location of the through openings 31 correspond to the shape and the location of the slot openings 21 of the casing panel 20. The sign panel 40 is mounted adjacent to an exterior side of the illuminating panel 30, and includes a plurality of through holes 41. The shape and the location of the through holes 41 correspond to the shape and the location of the through openings 31 of the casing panel 20. Besides, part of the sign panel 40 is transparent.

Therefore, the illuminating panel 30 of the invention can be illuminating through the power provided by the power supply connector 33, such that the functions of different I/O ports on the casing panel 20 can be displayed, even in a low light environment or in a completely dark environment. As a result, a user can easily differentiate and identify the functions of the I/O ports and plug/unplug or replace the peripheral device connectors successfully.

Figure 2:
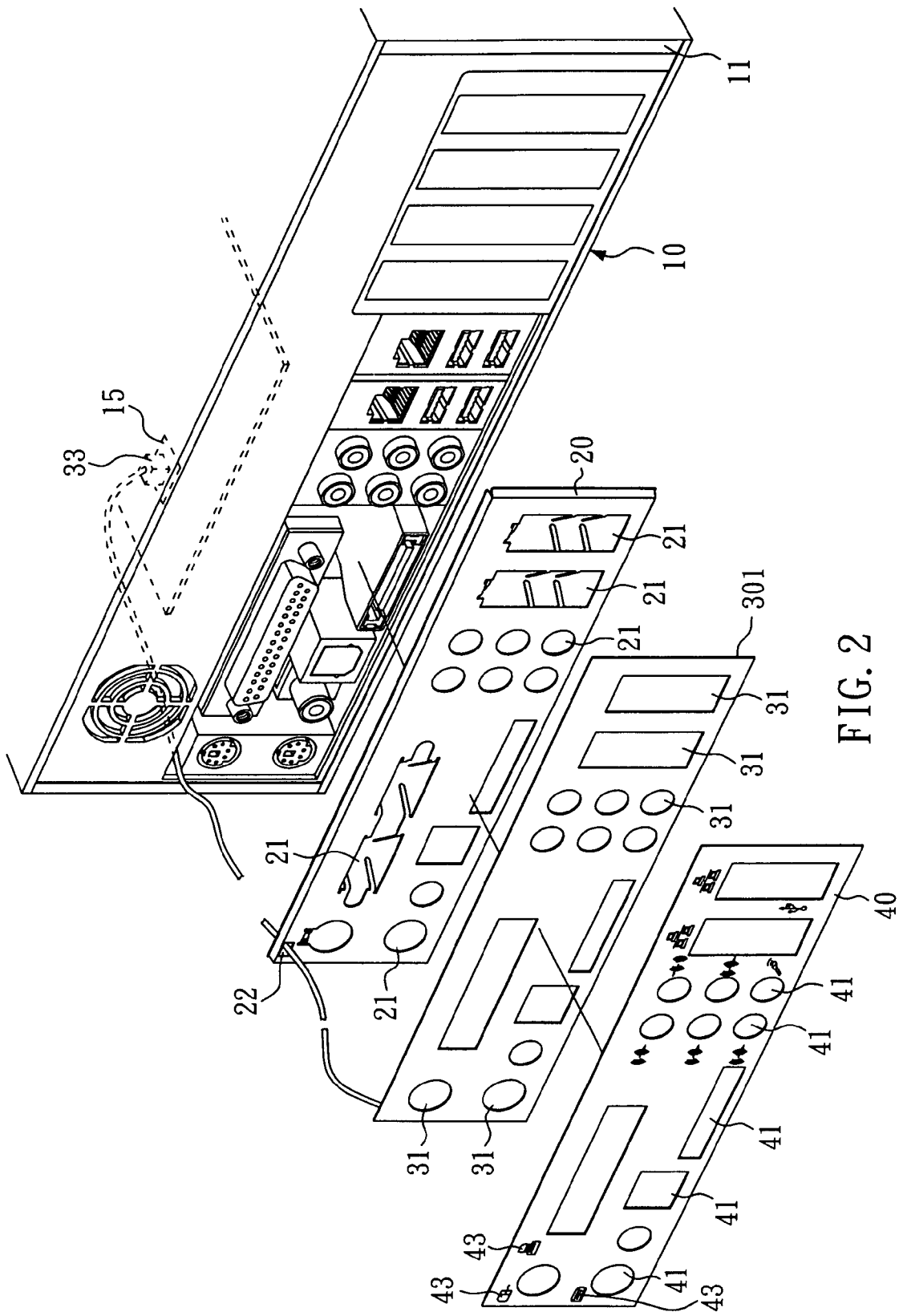
FIG. 2 is an exploded diagram of a sign structure for a personal computer according to a first preferred embodiment of the invention.

FIG. 2 shows an exploded diagram of sign structure for a personal computer according to a first preferred embodiment of the invention. The sign structure according to the first preferred embodiment of the invention includes a casing panel 20, an Electro Luminescent (EL) panel 301, and a sign panel 40. The casing panel 20 is mounted on a casing 11 of a personal computer 10. The casing panel 20 includes a plurality of slot openings 21, with shapes corresponding to those of different I/O ports. The casing panel 20 further includes an aperture 22. The EL panel 301 is adhered to the exterior surface of the casing panel 20, and has a plurality of through openings 31 the shapes and locations of which correspond to the shapes and the locations of the slot openings 21 of the casing 20. The EL panel 301 also includes a power supply connector 33, which is looped through the aperture 22 of the casing panel 20 and is electrically connected with the motherboard 15 of the personal computer 10.

Also, as shown in FIG. 2, the sign panel 40 is a thin panel made of a transparent material, and is adhered to an exterior side of the EL panel 301. The sign panel 40 includes a plurality of through holes 41 the shapes and locations of which correspond to the shapes and the locations of the through openings 31 of the casing panel 20. The sign panel 40 further has a plurality of sign labels 43 consisting of the combination of words, numbers, patterns, drawings, and symbols, in order to indicate the functions of different I/O ports on the casing panel 20 for user to identify. Additionally, surfaces of the sign labels 43 are coated with a luminous ink layer, to further brighten the sign labels 43 when the EL panel 301 is illuminating.

Figure 3:
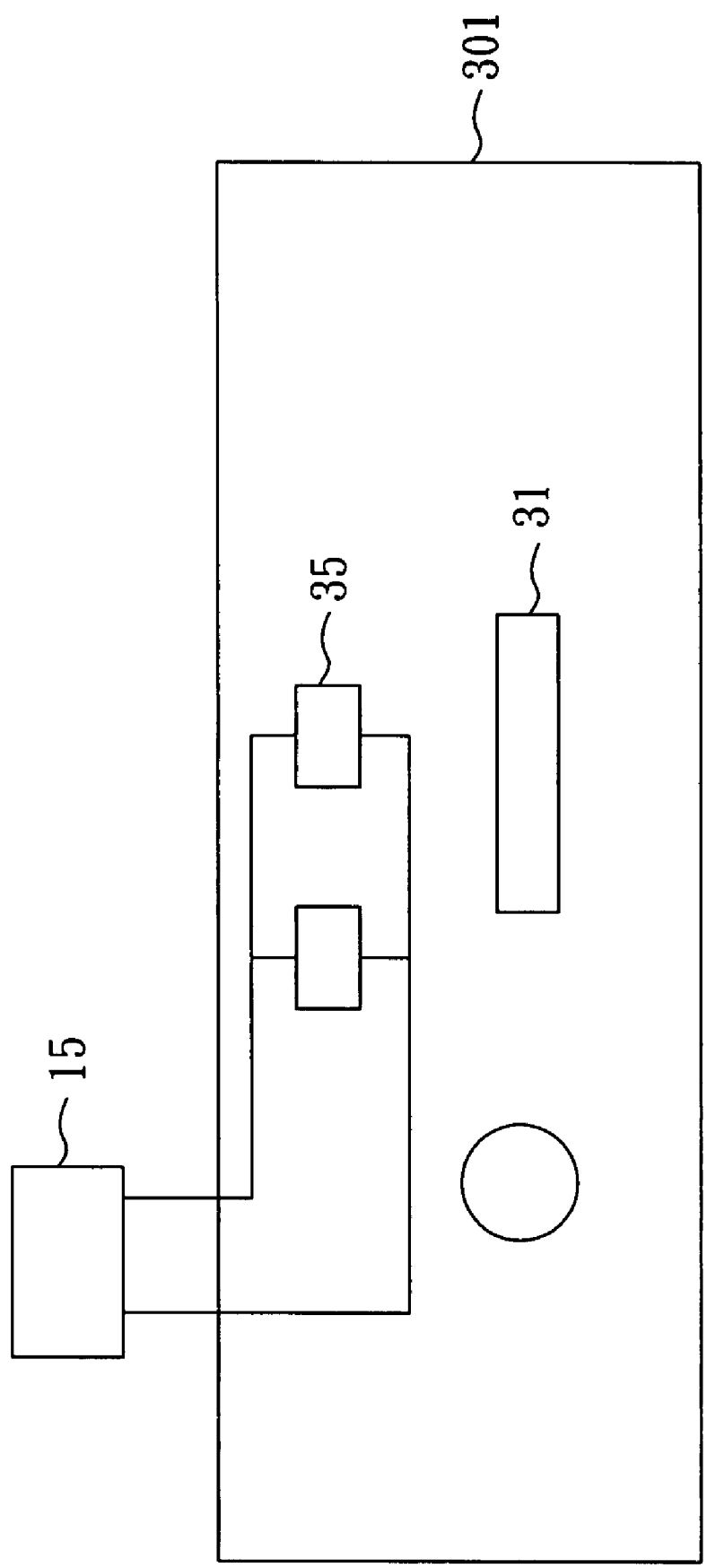
FIG. 3 is a schematic illustrating an electroluminescent panel according to the first preferred embodiment of the invention.

FIG. 3 shows the illustration of an EL panel according to the first preferred embodiment of the invention, with reference to FIG. 2. As shown in FIG. 3, a plurality of EL films 35 is positioned on the EL panel 301 with equal intervals thereinbetween. When the power supply connector 33 of the EL panel 301 establishes electrical connection with the motherboard 15 of the personal computer 10, the EL films 35 are illuminating.

Figure 4:
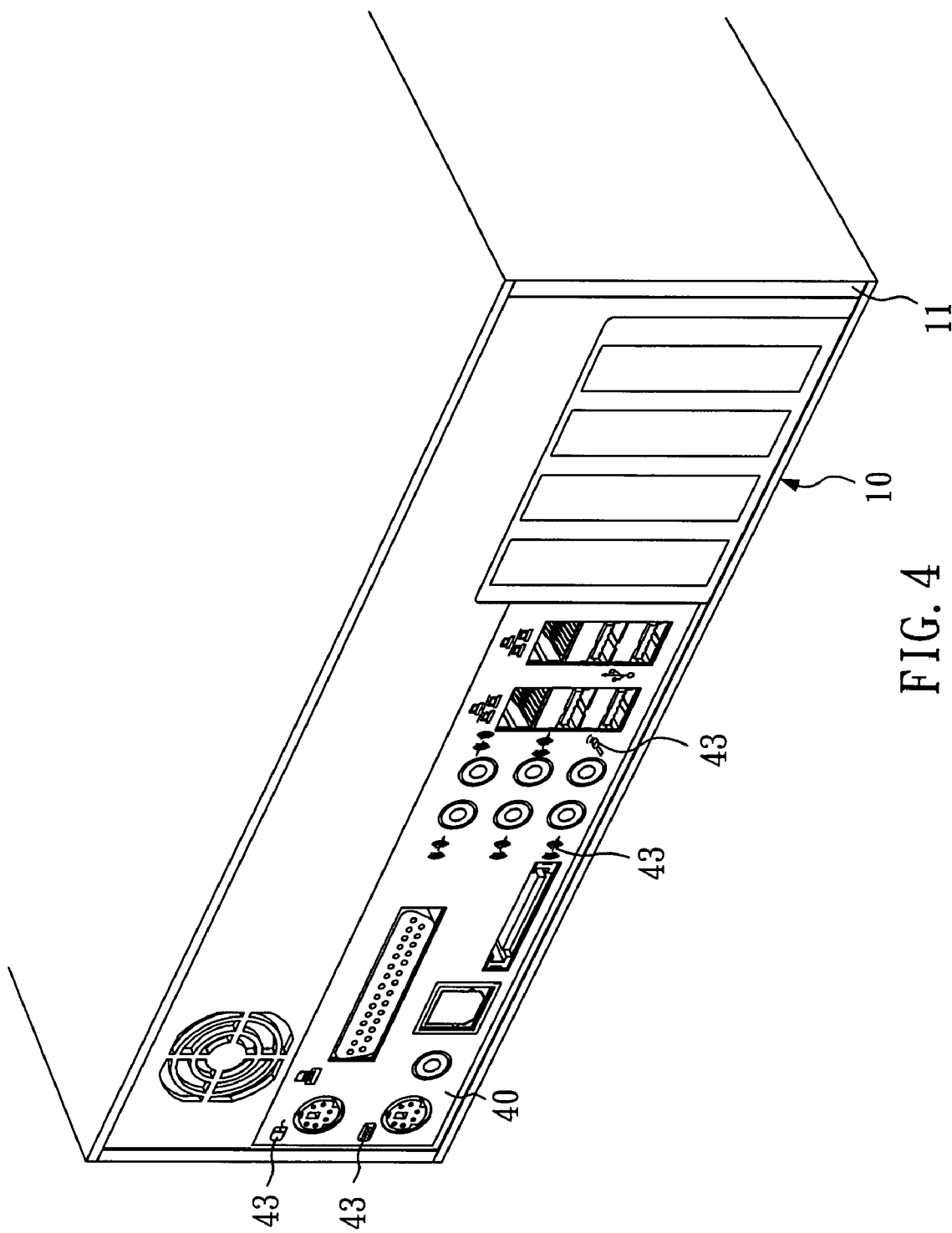
FIG. 4 is a perspective diagram illustrating a sign structure for a personal computer according to the first preferred embodiment of the invention.

FIG. 4 shows a perspective diagram illustrating the sign structure for a personal computer according to the first preferred embodiment of the invention, with reference to FIG. 2. The power supply connector 33 of the EL panel 301 is electrically connected with the motherboard 15 of the personal computer 10. When the personal compute 10 is actuated, the power can be provided to the EL panel 301 to illuminate, such that the functions of different I/O ports can be easily identified by the user, even in a low light environment or in a completely dark environment. As a result, the user can plug/unplug or replace the connectors of any kind of externally connected device or any kind of peripheral device.

Figure 5:
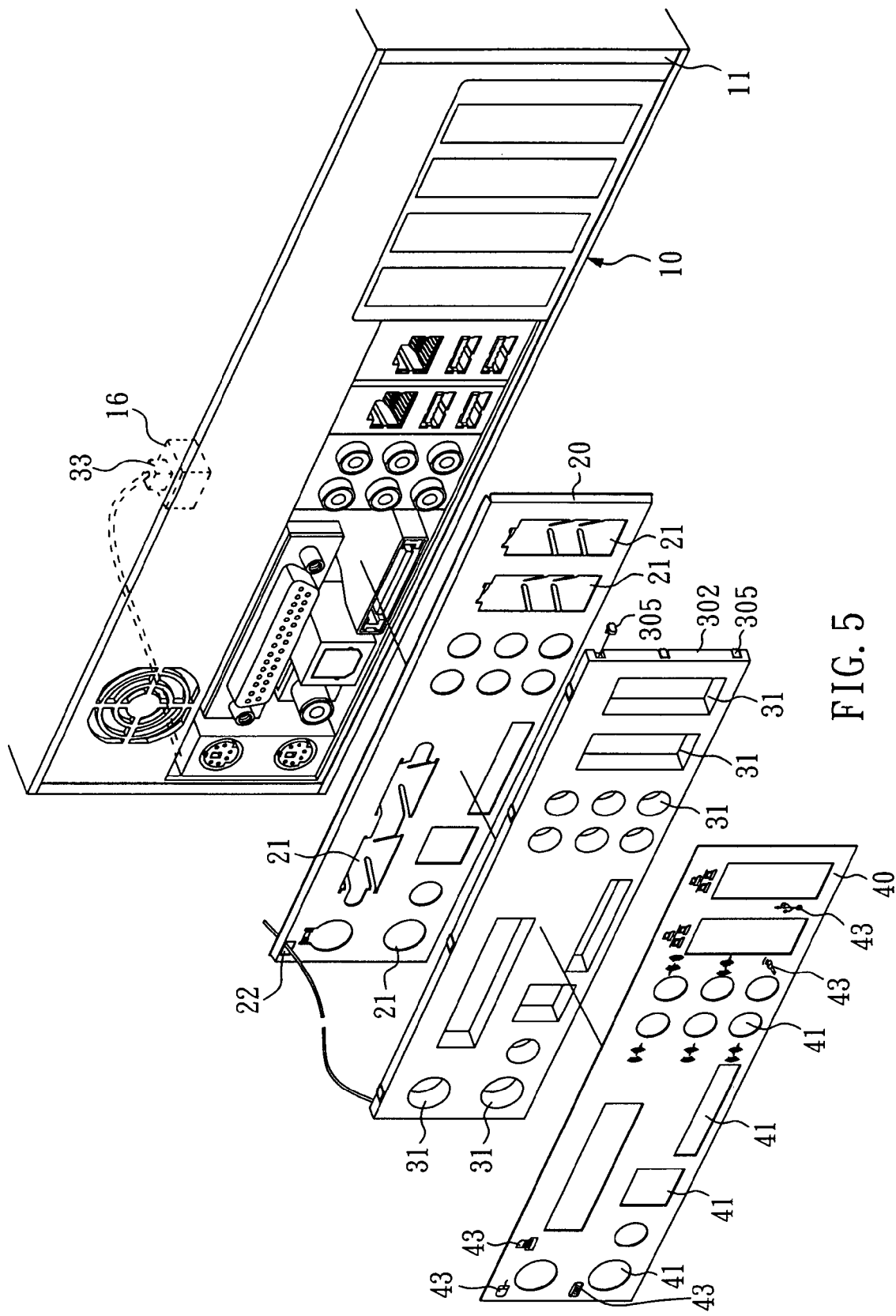
FIG. 5 is an exploded diagram of a sign structure for a personal computer according to a second preferred embodiment of the invention.

FIG. 5 shows an exploded diagram of a sign structure for a personal computer according to the second preferred embodiment of the invention. As shown in FIG. 5, the sign structure for a personal computer according to the second preferred embodiment is similar to the sign structure for a personal computer according to the first preferred embodiment. The only difference between them is the form of the illuminating panel. In the first preferred embodiment, the illuminating panel is an EL panel 301, while the illuminating panel in the second preferred embodiment is a combination of a light guide plate 302 and a plurality of Light Emitting Diodes (LEDs) 305. The LEDs 305 are disposed on the side of the light guide plate 302. The remaining elements of the sign structure for a personal computer according to the second preferred embodiment, including the casing panel 20 and the sign panel 40, are identical to those of the sign structure for a personal computer according to the first preferred embodiment. The power supply connectors 33 of the LEDs 305 in this preferred embodiment are electrically connected with the power supply 16 of the personal computer 10. Through the power provided by the power supply 16 of the personal computer 10, the LEDs 305 are illuminating. With the light guide plate 302, the LEDs 305 and the light guide plate 302 can provide similar effects as those accomplished by the EL panel of the first preferred embodiment. Therefore, the functions of different I/O ports can be easily identified by the user, even in a low light environment or in a completely dark environment. As a result, the user can plug/unplug or replace the connectors of any kind of externally connected device or any kind of peripheral device.

Although the present invention has been explained in relation to its preferred embodiment, it is to be understood that many other possible modifications and variations can be made without departing from the spirit and scope of the invention as hereinafter claimed.

What is claimed is:

1. A sign structure for a personal computer, comprising:
   a casing panel configured to be mounted to a personal computer having a plurality of Input/Output (I/O) ports, the casing panel comprising a plurality of slot openings each corresponding to one of said I/O ports;
   an illuminating panel, mounted adjacent to an exterior surface of the casing panel and comprising a plurality of through openings each corresponding to a respective one of said slot openings, and at least one power supply connector; and
   a sign panel, mounted adjacent to an exterior side of the illuminating panel, and comprising a plurality of through holes each corresponding to a respective one of said through openings, wherein at least part of the sign panel is transparent.

2. The sign structure for a personal computer as claimed in claim 1, wherein the illuminating panel is an electroluminescent panel.

3. The sign structure for a personal computer as claimed in claim 1, wherein the illuminating panel comprises a light guide plate and at least one light-emitting diode.

4. The sign structure for a personal computer as claimed in claim 1, wherein the illuminating panel is adhered to the exterior surface of the casing panel.

5. The sign structure for a personal computer as claimed in claim 1, wherein the sign panel is adhered to the exterior side of the illuminating panel.

6. The sign structure for a personal computer as claimed in claim 1 further comprising at least one sign label affixing on an exterior face of the sign panel.

7. The sign structure for a personal computer as claimed in claim 6, wherein an exterior surface of the sign label is coated with a luminous ink layer.

8. The sign structure for a personal computer as claimed in claim 1, wherein the exterior face of the sign panel is coated with a luminous ink layer.

9. The sign structure for a personal computer as claimed in claim 1, wherein the at least one power supply connector is electrically connected with a motherboard of the personal computer.

10. The sign structure for a personal computer as claimed in claim 1, wherein the at least one power supply connector is electrically connected with a power supply of the personal computer.

* * * * *